US009576208B2

(12) United States Patent
Agnew et al.

(10) Patent No.: US 9,576,208 B2
(45) Date of Patent: Feb. 21, 2017

(54) EMERGENCY VEHICLE DETECTION WITH DIGITAL IMAGE SENSOR

(71) Applicant: Continental Automotive Systems, Inc., Auburn Hills, MI (US)

(72) Inventors: David Agnew, Clarkston, MI (US); Stefan Lüke, Bad Homburg (DE); Marc Fischer, Nonnenhorn (DE); Dieter Krökel, Eriskirch (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/558,289

(22) Filed: Dec. 2, 2014

(65) Prior Publication Data

US 2015/0161458 A1 Jun. 11, 2015

Related U.S. Application Data

(60) Provisional application No. 61/914,572, filed on Dec. 11, 2013.

(51) Int. Cl.
*G06K 9/00* (2006.01)
*H04N 7/18* (2006.01)

(52) U.S. Cl.
CPC .............................. *G06K 9/00825* (2013.01)

(58) Field of Classification Search
USPC ............... 382/100, 103–107, 155, 162, 168, 173,382/181, 189, 199, 203, 207–210, 219, 224,382/232, 254, 274, 276, 286–291, 305, 312,382/321; 174/36; 340/901, 426.16; 70/11; 348/118, 148; 381/56; 250/33
See application file for complete search history.

(56) References Cited

U.S. PATENT DOCUMENTS

| 5,894,279 | A  | * | 4/1999 | Rose | G08G 1/0965 174/36 |
| 6,362,749 | B1 | * | 3/2002 | Brill | G08G 1/0965 174/36 |
| 6,778,101 | B2 | * | 8/2004 | Turbeville | G08G 1/0965 340/901 |
| 8,842,021 | B2 | * | 9/2014 | Behm | G08G 1/0965 340/426.16 |
| 2004/0064220 | A1 | * | 4/2004 | Kobayashi | B60W 50/0205 701/1 |
| 2005/0023465 | A1 | * | 2/2005 | Eggers | B60R 1/00 250/330 |
| 2013/0093889 | A1 | * | 4/2013 | Headley | B60R 1/00 348/148 |

(Continued)

FOREIGN PATENT DOCUMENTS

DE  102010022165 A1   1/2011
EP       1251032    * 10/2002  ............... B60Q 1/52

(Continued)

OTHER PUBLICATIONS

Great Britain Search Report dated Mar. 13, 2015.

*Primary Examiner* — Seyed Azarian

(57) ABSTRACT

A display system for a vehicle comprises a display mounted within a passenger compartment of a vehicle and at least one camera mounted to the vehicle and facing at least partially in a rear direction. The display shows the images recorded by the camera(s) to provide a rear view for the driver of the vehicle. An ECU is controllably connected to the display screen and the at least one camera to analyze an image from the at least one camera to detect when an object in the image is an emergency vehicle; and to activate an alert on the display when an emergency vehicle is detected.

8 Claims, 3 Drawing Sheets

(56) References Cited

U.S. PATENT DOCUMENTS

2013/0188794 A1* 7/2013 Kawamata .............. G01S 3/803
                                                                                                 381/56
2014/0078291 A1* 3/2014 Hammarstrom ....... G08G 1/163
                                                                                                 348/118

FOREIGN PATENT DOCUMENTS

| EP | 1251032 A2 | 10/2002 |
| EP | 1152218 A2 | 9/2006 |
| GB | 2399246 A | 9/2004 |
| JP | 11306494 A | 11/1999 |
| JP | 4807263 A | 2/2011 |
| WO | 2014039805 A1 | 3/2014 |

* cited by examiner

EMERGENCY VEHICLE DETECTION WITH DIGITAL IMAGE SENSOR

CROSS-REFERENCE TO RELATED APPLICATIONS

This disclosure claims priority to U.S. Provisional Application No. 61/914,572, which was filed on Dec. 11, 2013 and is incorporated herein by reference.

TECHNICAL FIELD

The present disclosure relates to automotive vehicles, and more particularly to driver assistance devices for automotive vehicles.

BACKGROUND

Rear view mirrors are used to assist a driver in backing up a vehicle and to view vehicles located behind them. Rear view mirrors are typically secured to the top-center of the windshield area for convenience of the driver. However, the mirror may be partially or fully obstructed by window pillars, passengers, luggage, headrests, video monitors or other objects located in the passenger compartment of the vehicle. Additionally, objects such as bike or tire racks may block the rear window of the vehicle also partially or fully obstructing the rear view mirror. A new trend in automotive technology is using a rear facing camera and display monitor in place or in addition to a rear view mirror.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A display system for a vehicle comprises a display mounted within a passenger compartment of a vehicle and at least one camera mounted to the vehicle and facing at least partially in a rear direction. The display shows the images recorded by the camera(s) to provide a rear view for the driver of the vehicle. An electronic control unit ("ECU") is controllably connected to the display screen and the at least one camera to analyze an image from the at least one camera to detect when an object in the image is an emergency vehicle; and to activate an alert on the display when an emergency vehicle is detected.

A method for providing a rear view image for a vehicle comprises recording a rear view of the vehicle with at least one camera that is at least partially facing in a rear direction and analyzing the image of to determine if an object is an emergency vehicle. An alert is shown to highlight the emergency vehicle on a display visible to the driver when the emergency vehicle is detected.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
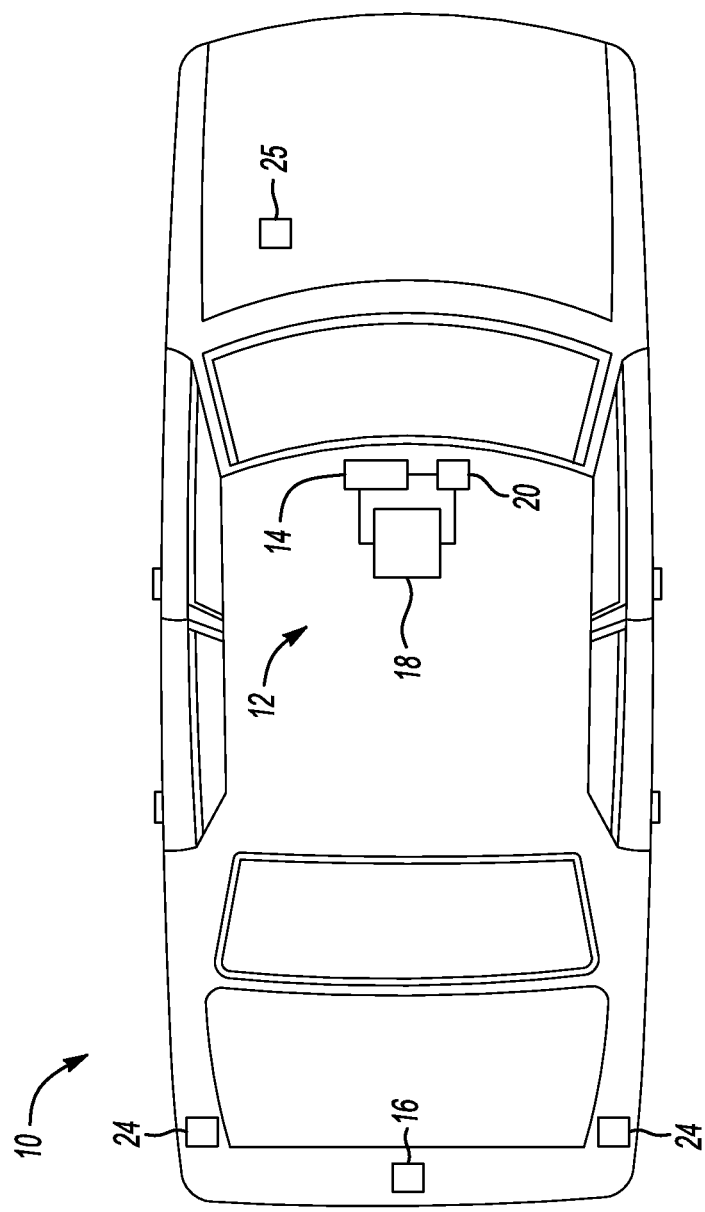
FIG. 1 is a schematic illustration of a vehicle having a display system of the present invention.
Figure 2:
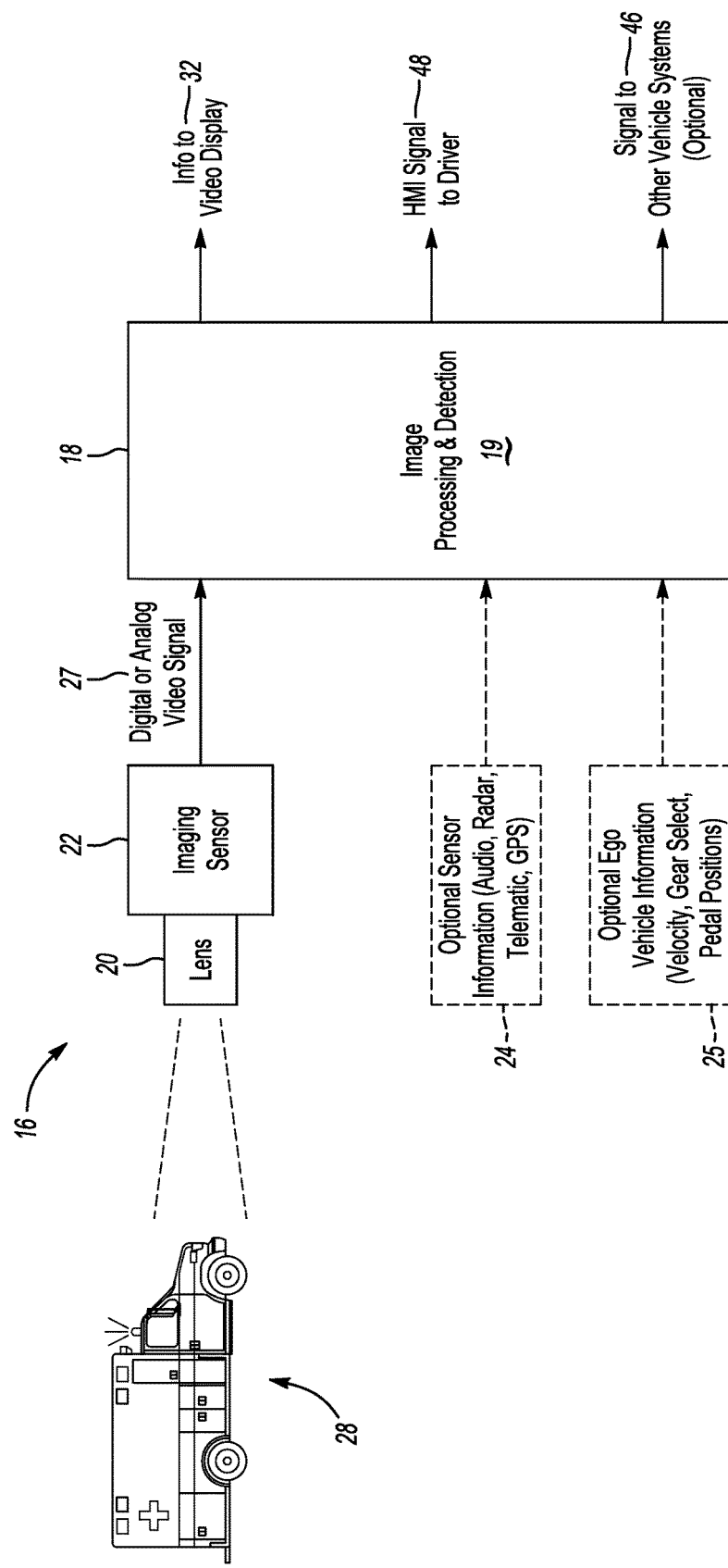
FIG. 2 is a schematic illustration first embodiment of a display system for a vehicle.
Figure 3:
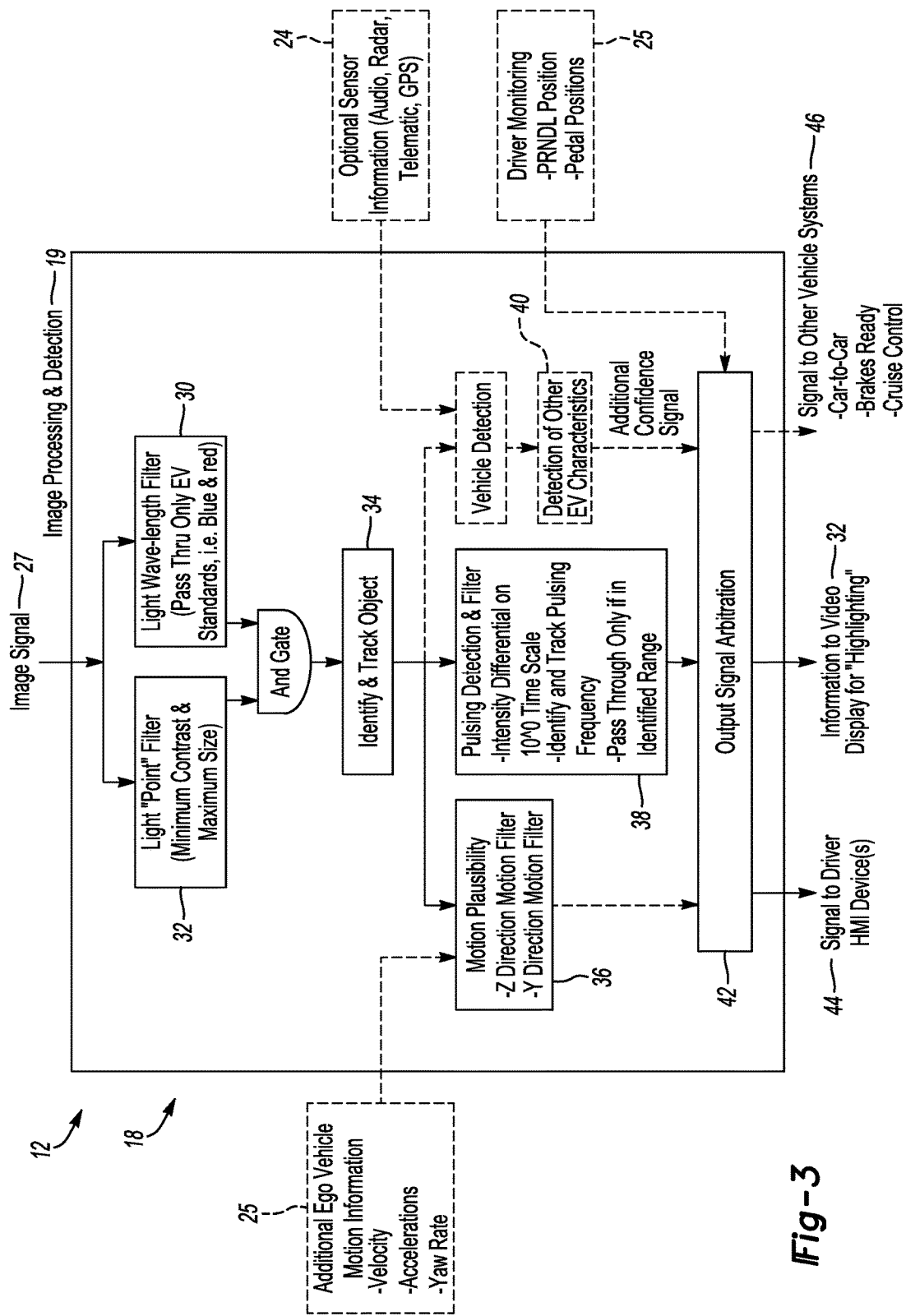
FIG. 3 is a schematic diagram of a control program for the display system for the vehicle of FIGS. 1-2.

The following description is merely exemplary in nature and is in no way intended to limit the disclosure, its application, or uses. For purposes of clarity, the same reference numbers will be used in the drawings to identify similar elements. FIGS. 1-3 illustrate a first embodiment of a vehicle 10 and a display system 12 with emergency vehicle detection. Throughout the application the relative directions such as forward and rear are in reference to the direction which a driver for the vehicle 10 would primarily be facing when operating the vehicle 10. The display system 12 includes a display screen 14 mounted to the vehicle 10 in an easily accessible location for a driver to observe.

The display screen 14 is connected to at least one camera 16 mounted to the rear of the vehicle 10. The camera 16 may also be a wide-angle camera, such that a larger area may be viewed. The camera 16 and the display screen 14 are connected to an electronic control unit ("ECU") 18, which controls the display screen 14 and the camera 16. The camera 16 includes a lens 20 and an image sensor 22. Other sensors 24 may also be connected to the ECU 18. For example, audio sensors radar sensors, telematic sensors, etc. Additionally, a GPS system for the vehicle 10 can also be connected to provide information to the ECU 18. Other vehicle information 25 may also be used by the ECU 18 including velocity, gear selection, pedal position(s), etc.

The ECU 18 has the capability for image processing and detection of specific images. In the embodiment described herein, the ECU 18 may process the image to detect an emergency vehicle 28 that is captured by the camera 16 image. The ECU 18 sends a signal 32, 44 to the display 14 to alert the driver when an emergency vehicle 28 is detected. The alert may be highlighting 32 a section of a display screen 14 which shows a rear view image of the vehicle 10. For example, when a camera 16 and display 14 assembly are used in place of a rear view mirror, or by displaying an image from a rear facing camera on a navigation screen for the vehicle 10. Alternately, the signal can be an alert on the display 14, which may be an instrument panel for the vehicle 10.

The display screen 14 may be mounted in the traditional rear-view mirror position, proximate to the upper center of the windshield. Other mounting positions for the display screen 14 may also be considered. The display screen 14 may be set to primarily show the image from the camera 16. However, the display system 12 may include a feature to also provide additional information to the driver about the rear view of the vehicle 10. The ECU 18 controls the image 24 on the display screen 14 as well as the position of the camera(s) 16. Because the rear view image 24 provided to the driver is supplied by the camera(s) 16 objects within the passenger compartment will not obstruct the view. The display screen 14 can be controlled by the ECU 18 to provide the additional information. The ECU 18 may serve to highlight features or objects 32 on the display screen 14 as well. For example, emergency vehicles, motorcycles that may be difficult to see, or a missed turn, if a navigation system has been programmed. Highlighting 32 a feature or object 28 may be accomplished by brightening that portion of the display or circling or outlining the object in a highlighting color.

The camera 16 may also be used by other vehicle 10 systems, such as vehicle 10 backing systems, park assist, and for providing top views of the vehicle 10. Additional features 20 such as sensors or cameras for other systems may be connected to the ECU 18 as well to send information that may be displayed or used by the system 12.

For the driver of a motor vehicle, when being approached from behind by an emergency vehicle (police, ambulance, fire truck . . . ) 28, there is a need or expectation upon this driver to 1) notice the emergency vehicle 28 and that it is approaching to overtake, and 2) take appropriate action to allow quick and safe passage of the emergency vehicle 28, e.g. slow down, move to the shoulder of the road. Often, drivers may not notice the rearward approaching emergency vehicle 28 and the normal signals they send (flashing lights, siren, bold graphics).

One implementation of the algorithm is shown in FIG. 2. The rearward looking camera 16 is utilized to continuously monitor the rear traffic area for potential emergency vehicles 28 by applying digital processing algorithms 19 to the video image signal 27. The image signal 27 is sent from the camera 16 to the ECU 18. Other information including additional sensor information 24, and/or vehicle information 25 may also be received and used by the ECU 18. The ECU performs image processing and object detection 19 to recognize objects of interest, e.g. emergency vehicles 28. If an emergency vehicle 28 is identified, a signal 32, 44, is sent to an HMI device to actively notify the driver that there is an emergency vehicle 28 behind him/her. Additional signals 46 can also be sent to other vehicles to provide alerts to vehicles in the proximity.

FIG. 3, illustrates one embodiment of the digital processing and detection, which is performed by the ECU 18. The ECU 18 may also use a microphone, located inside the vehicle or outside of the vehicle, 24. Sounds detected by the microphone can be combined with the digital analysis 19 to help detect an approaching emergency vehicle 28. Additionally, the outside microphone information may be played over the vehicle audio system 44 to provide a warning of the detected emergency vehicle 28 to the driver. The ECU 18 may also use map data 24 to reduce the regions of interest for the camera 16. That is, to assist the digital analysis 19 to focus on area of interest and, thus, more quickly process the information. The region of interest may be reduced at high speeds, to reduce the computation power or to concentrate it on a smaller field of view. The analysis by the ECU 18 may also classify, and may visualize, the type of emergency vehicle (fire, police, etc) 28. Emergency vehicle characteristics may be different for various states or countries, so the ECU 18 may use parameters for the pulse frequency and the color of the lights to help identify the type of vehicle detected.

Utilizing the information of typical emergency vehicle 28 flashing or pulsing lights, the functional routine looks for correct color (via wavelength filtering), shown at 30, and localized intensity (contrast, size, shape), shown at 32. If a potential "point" passes the filter it is identified and, tracked 34. The ECU 18 then evaluates the flashing characteristics 38, and identifies if they are within range of standard emergency vehicles lights. Additional plausibility is made by evaluating the motion of the tracked point 40. This step could be additionally enhanced by utilizing available vehicle motion information, 36.

THE ECU 18 also performs signal arbitration 42 to determine the signal output. If an emergency vehicle 28 is identified, the system 12 may provide a signal 32 to highlight an area of the display 14. In addition, or alternately a signal 44 is sent to an HMI device to actively notify the driver that there is an emergency vehicle 28 behind him/her, e.g. sounding a horn through the vehicle audio system. Additional signals 46 can also be sent to other vehicles to provide alerts to vehicles in the proximity.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A display system for a vehicle comprising:
   a display mounted within a passenger compartment of a vehicle such that the display screen is visible to an driver of the vehicle;
   a microphone for receiving sounds;
   at least one camera mounted to the vehicle and facing at least partially in a rear direction, wherein the camera includes a lens and an image sensor; and
   an electronic control unit ("ECU") controllably connected to the display screen, the microphone, and the at least one camera, the ECU configured to analyze sounds received by the microphone and an image from the at least one camera using a light wavelength filter to detect when an object in the image is an emergency vehicle and show the image from the at least one camera on the display;
   wherein the ECU alters the image from the at least one camera on the display when an emergency vehicle is detected.

2. The display system of claim 1, wherein the image on the display is altered by highlighting a selected portion of the image.

3. The display system of claim 1, wherein microphone is an exterior microphone and wherein sounds from the microphone may be played by a vehicle audio system to warn of the detected emergency vehicle.

4. The display system of claim 1, wherein the ECU uses map data to reduce the regions of interest for the at least one camera.

5. The display system of claim 1, wherein the ECU determines the type of emergency vehicle that is detected.

6. The display system of claim 1 wherein the ECU contains parameters for a pulse frequency, and light colors for a plurality of different types of emergency vehicles.

7. An emergency vehicle detection system for a vehicle comprising:
   a camera mounted to the vehicle and facing at least partially in a rear direction, wherein the camera includes a lens and an image sensor;
   a microphone disposed outside of the vehicle for receiving sounds;
   an electronic control unit ("ECU") in communication with the camera and the microphone;
   a display in communication with the ECU and mounted within a passenger compartment of a vehicle such that the display screen is visible to an driver of the vehicle; and
   an audio system in communication with the ECU;

the ECU configured to analyze the sounds received from the microphone and an image from the camera to detect when an object in the image is an emergency vehicle using a light wavelength filter; and the ECU further configured to play information received from the microphone over the audio system in response to detecting the emergency vehicle.

8. The system of claim 7, wherein the ECU alters the image on the display when an emergency vehicle is detected.

* * * * *